United States Patent
Avigur et al.

(10) Patent No.: US 11,927,228 B2
(45) Date of Patent: Mar. 12, 2024

(54) SYSTEMS FOR LOCKING ROTATABLE SHAFT

(71) Applicant: REE AUTOMOTIVE LTD, Kibbutz Glil-Yam (IL)

(72) Inventors: Eylon Avigur, Ramat-Gan (IL); Tomer Segev, Tel-Aviv (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 0 days.

(21) Appl. No.: 18/330,373

(22) Filed: Jun. 7, 2023

(65) Prior Publication Data
US 2023/0313854 A1 Oct. 5, 2023

Related U.S. Application Data

(63) Continuation of application No. PCT/IL2022/051208, filed on Nov. 13, 2022.
(Continued)

(51) Int. Cl.
*F16D 63/00* (2006.01)
*B60B 27/00* (2006.01)
(Continued)

(52) U.S. Cl.
CPC ........ *F16D 63/006* (2013.01); *B60B 27/0047* (2013.01); *B60K 7/0007* (2013.01);
(Continued)

(58) Field of Classification Search
CPC ............... F16D 63/006; F16D 2121/24; B60B 27/0047; B60B 2900/112; B60B 2900/115; B60K 17/043; B60K 2007/0061
(Continued)

(56) References Cited

U.S. PATENT DOCUMENTS 1,393,051 A * 10/1921 Tamborello ............. B60T 1/005
　　　　　　　　　　　　　　　　　　　188/30
4,034,824 A * 7/1977 Lucas ..................... B60R 25/09
　　　　　　　　　　　　　　　　　　　188/69
(Continued)

FOREIGN PATENT DOCUMENTS

CN 　　214788999 U 　　11/2021
DE 　102005058821 A1 　　6/2007
(Continued)

OTHER PUBLICATIONS

International Search Report dated Jan. 12, 2023 for PCT Application No. PCT/IL2022/051208, International Filing Date Nov. 13, 2022.

*Primary Examiner* — Hau V Phan
(74) *Attorney, Agent, or Firm* — PEARL COHEN ZEDEK LATZER BARATZ LLP

(57) ABSTRACT

A system for locking a rotatable shaft may include a base member couplable to the rotatable shaft and rotatable about a rotation axis of the rotatable shaft through a plurality of angular positions, the base member comprises two or more curved slots; two or more pins positioned with respect to the base member such that at least one of the two or more pins is aligned with at least one of the two or more curved slots of the base member for any angular position of the base member; and an actuator to displace at least one of the two or more pins to removably insert at least one of the two or more pins into at least one of the two or more curved slots.

29 Claims, 13 Drawing Sheets

Related U.S. Application Data

(60) Provisional application No. 63/313,666, filed on Feb. 24, 2022.

(51) Int. Cl.
| | |
|---|---|
| *B60K 7/00* | (2006.01) |
| *B60K 17/04* | (2006.01) |
| *F16H 63/34* | (2006.01) |
| *B60T 13/74* | (2006.01) |
| *F16D 121/24* | (2012.01) |
| *F16D 125/40* | (2012.01) |
| *F16D 125/44* | (2012.01) |
| *F16H 57/02* | (2012.01) |

(52) U.S. Cl.
CPC ....... *B60K 17/043* (2013.01); *F16H 63/3441* (2013.01); *B60B 2900/112* (2013.01); *B60B 2900/115* (2013.01); *B60K 2007/0061* (2013.01); *B60T 13/746* (2013.01); *F16D 2121/24* (2013.01); *F16D 2125/40* (2013.01); *F16D 2125/44* (2013.01); *F16H 57/02* (2013.01); *F16H 2057/02026* (2013.01); *F16H 2057/02034* (2013.01); *F16H 2057/02052* (2013.01); *F16H 63/3466* (2013.01)

(58) Field of Classification Search
USPC ........................................................ 180/65.6
See application file for complete search history.

(56) References Cited

U.S. PATENT DOCUMENTS

| | | | | |
|---|---|---|---|---|
| 9,447,845 | B2* | 9/2016 | Jeon | F16H 1/00 |
| 9,862,263 | B2* | 1/2018 | Tesar | B60K 17/02 |
| 10,655,706 | B2* | 5/2020 | Tesar | F16H 57/08 |
| 10,822,215 | B2* | 11/2020 | Cardona | F16D 63/006 |
| 2004/0163869 | A1* | 8/2004 | Chun | B60T 1/062 |
| | | | | 180/209 |
| 2014/0224064 | A1* | 8/2014 | Tesar | F16H 1/32 |
| | | | | 74/606 R |
| 2020/0324755 | A1* | 10/2020 | Lahr | B60K 6/48 |

FOREIGN PATENT DOCUMENTS

| | | |
|---|---|---|
| DE | 102017125786 A1 | 5/2019 |
| DE | 102018220248 A1 | 5/2020 |
| KR | 101302302 B1 | 9/2013 |

\* cited by examiner

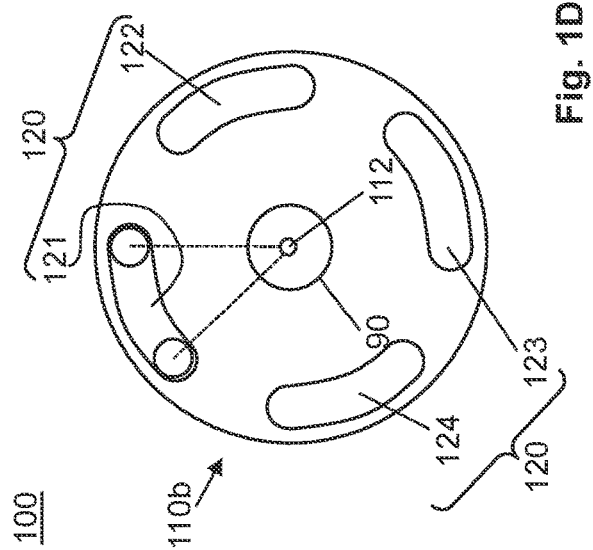
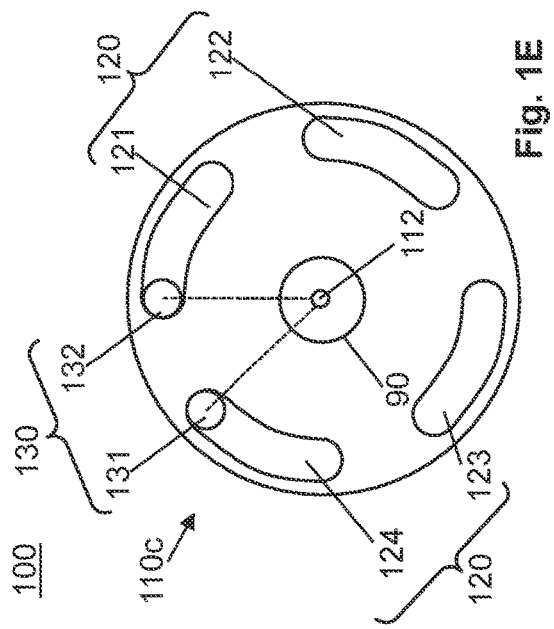
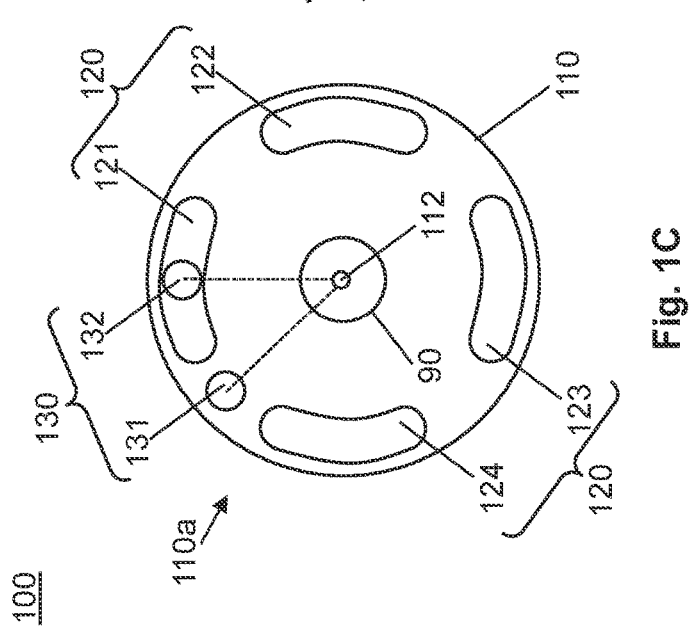

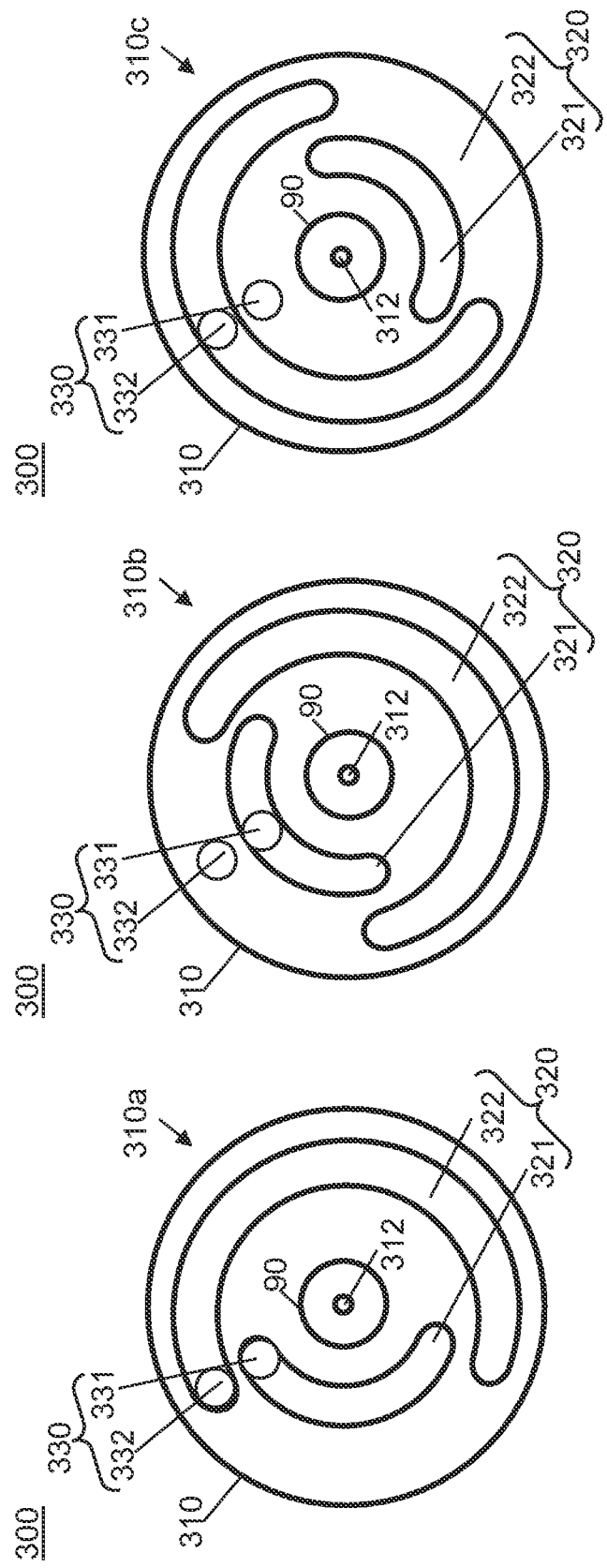

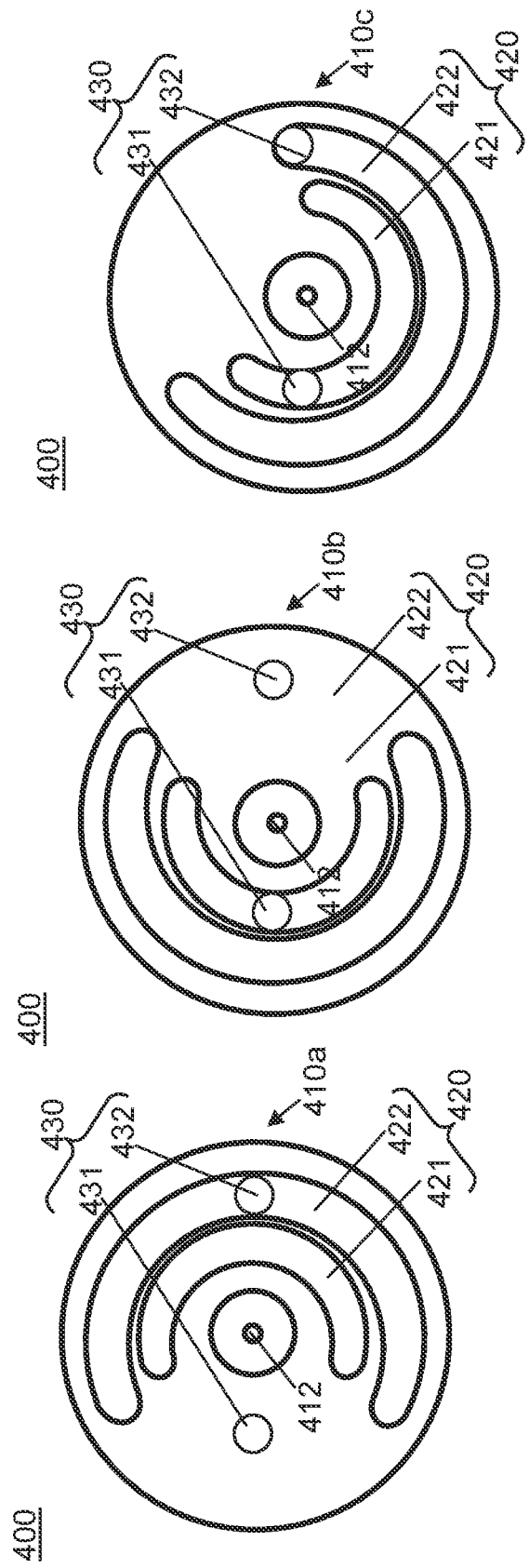

SYSTEMS FOR LOCKING ROTATABLE SHAFT

CROSS-REFERENCE TO RELATED APPLICATIONS

This application is a continuation of PCT International Application No. PCT/IL2022/051208, International Filing Date Nov. 13, 2022, which claims the benefit of U.S. Provisional Patent Application No. 63/313,666, filed Feb. 24, 2022, which are hereby incorporated by reference in their entirety.

FIELD OF THE INVENTION

The present invention relates to the field of systems for locking a rotatable shaft, and more particularly, to lock systems for vehicles.

BACKGROUND OF THE INVENTION

Current systems for locking a rotatable shaft typically include friction or clutch discs that, when actuated, stop rotation of the shaft and lock the shaft. However, such clutch-based systems are complex and expensive. If the shaft is connected to a gear, some current systems include a tooth that, when actuated, engages with teeth of the gear to lock the shaft. However, such tooth-based systems typically require completely stopping rotation of the shaft before engaging the tooth with the teeth of the gear.

SUMMARY OF THE INVENTION

Some embodiments of the present invention may provide a system for locking a rotatable shaft, the system may include: a base member couplable to the rotatable shaft and rotatable about a rotation axis of the rotatable shaft through a plurality of angular positions, the base member includes a first curved slot and a second curved slot; a first pin and a second pin being positioned with respect to the base member such that at least one of the first pin or the second pin is aligned with at least one of the first curved slot or the second curved slot of the base member for any angular position of the base member; and an actuator to displace at least one of the first pin or the second pin to removably insert at least one of the first pin or the second pin into at least one of the first curved slot or the second curved slot.

In some embodiments, the system is coupled to or included in a gear assembly having a gear coupled to the rotatable shaft, wherein the base member is coupled to or is an integral portion of the gear.

In some embodiments, the system is coupled to or included in a wheel hub assembly having a hub coupled to the rotatable shaft, wherein the base member is coupled to or is an integral portion of the hub.

In some embodiments, the first curved slot and the second curved slot are circular arc slots.

In some embodiments, the first curved slot and the second curved slot are formed on a flat surface of the base member.

In some embodiments, the first pin and the second pin are substantially parallel to the rotation axis of the rotatable shaft.

In some embodiments, the first curved slot and the second curved slot are positioned along a circle having a center point that coincides with the rotation axis of the rotatable shaft.

In some embodiments, the first curved slot and the second curved slot having the same arc slot length and are equally spaced along the circle.

In some embodiments, the first pin and the second pin are positioned along the circle.

In some embodiments, an arc length or distance measured along the circle between most proximal points on the first pin and the second pin is equal to an arc length or distance measured along the circle between the first curved slot and the second curved slot.

In some embodiments, an arc length or distance measured along the circle between most distal points on the first pin and the second pin is equal to the arc slot length of the first curved slot and the second curved slot.

In some embodiments, the first curved slot is positioned along a first circle having a first radius and a first center point that coincides with the rotation axis, wherein the second curved slot is positioned along a second circle having a second radius and a second center point that coincides with the rotation axis, and wherein the second radius is greater that the first radius.

In some embodiments, the first curved slot having a first arc slot length measured along the first circle and the second curved slot having a second arc slot length measured along the second, and wherein second arc slot length is greater than the first arc slot length.

In some embodiments, the first pin is positioned along the first circle and the second pin is positioned along the second circle.

In some embodiments, the first curved slot and the second curved slot are on opposite sides of the base member with respect to the rotation axis of the base member.

In some embodiments, the first pin and the second pin are on the same side of the base member with respect to the rotation axis of the base member.

In some embodiments, the first curved slot and the second curved slot are on the same side of the base member with respect to the rotation axis of the base member.

In some embodiments, the first pin and the second pin are on opposite sides of the base member with respect to the rotation axis of the base member.

In some embodiments, the first curved slot and the second curved slot are formed on a lateral surface of the base member.

In some embodiments, the first pin and the second pin are substantially perpendicular to the rotation axis of the rotatable shaft.

In some embodiments, the first curved slot and the second curved slot having the same arc slot length and are equally spaced on the lateral surface of the base member.

In some embodiments, each of the first pin and the second pin is spring-loaded.

In some embodiments, the system includes three or more curved slots.

In some embodiments, the system includes three or more pins.

In some embodiments, a maximal backlash of the base member is smaller than an arc slot length of the first curved slot or the second curved slot.

Some embodiments of the present invention may provide a system for locking a rotatable shaft, the system may include: a base member couplable to the rotatable shaft and rotatable about a rotation axis of the rotatable shaft through a plurality of angular positions, the base member includes two or more curved slots; two or more pins being positioned with respect to the base member such that at least one of the two or more pins is aligned with at least one of the two or more curved slots of the base member for any angular position of the base member; and an actuator to displace at least one of the two or more pins to removably insert at least one of the two or more pins into at least one of the two or more curved slots.

In some embodiments, the system is coupled to or included in a gear assembly having a gear coupled to the rotatable shaft, wherein the base member is coupled to or is an integral portion of the gear.

In some embodiments, the system is coupled to or included in a wheel hub assembly having a hub coupled to the rotatable shaft, wherein the base member is coupled to or is an integral portion of the hub.

In some embodiments, the two or more curved slots are circular arc slots.

In some embodiments, the two or more curved slots are formed on a flat surface of the base member.

In some embodiments, the two or more pins are substantially parallel to the rotation axis of the rotatable shaft.

In some embodiments, the two or more curved slots are positioned along a circle having a center point that coincides with the rotation axis of the rotatable shaft.

In some embodiments, the two or more curved slots having the same arc slot length and are equally spaced along the circle.

In some embodiments, the two or more pins are positioned along the circle.

In some embodiments, an arc length or distance measured along the circle between most proximal points on each two adjacent pins of the two or more pins is equal to an arc length or distance measured along the circle between each two adjacent curved slots of the two or more curved slots.

In some embodiments, an arc length or distance measured along the circle between most distal points on each two adjacent pins of the two or more pins is equal to the arc slot length of two or more curved slots.

In some embodiments, wherein the two or more curved slots are positioned at different radial distances from the rotation axis of the rotatable shaft with respect to each other.

In some embodiments, the two or more pins are positioned at the different radial distances from the rotation axis of the rotatable shaft with respect to each other.

In some embodiments, a curved slot positioned at a greater radial distance from the rotation axis having a greater arc slot length than an arc slot length of a curved slot positioned at a smaller distance from the rotation axis.

In some embodiments, a first group of the two or more slots and a second group of the two or more slots are on opposite sides of the base member with respect to the rotation axis of the base member.

In some embodiments, the two or more pins are on the same side of the base member with respect to the rotation axis of the base member.

In some embodiments, the two or more curved slots are on the same side of the base member with respect to the rotation axis of the base member.

In some embodiments, a first group of the two or more pins and a second group of the two or more pins are on opposite sides of the base member with respect to the rotation axis of the base member.

In some embodiments, the two or more curved slots are formed on a lateral surface of the base member.

In some embodiments, the two or more pins are substantially perpendicular to the rotation axis of the rotatable shaft.

In some embodiments, the two or more curved slots having the same arc slot length and are equally spaced on the lateral surface of the base member.

In some embodiments, the two or more pins are spring-loaded.

In some embodiments, a maximal backlash of the base member is smaller than an arc slot length of the two or more curved slots.

Some embodiments of the present invention may provide a wheel drive system including: a shaft rotatable about a rotation axis through a plurality of angular positions; a gear coupled to the shaft; a base member coupled to or being an integral portion of the gear, the base member includes a first curved slot and a second curved slot; a first pin and a second pin being positioned with respect to the base member such that at least one of the first pin or the second pin is aligned with at least one of the first curved slot or the second curved slot of the base member for any angular position of the base member; and an actuator to displace at least one of the first pin or the second pin to removably insert at least one of the first pin or the second pin into at least one of the first curved slot or the second curved slot.

In some embodiments, the wheel drive system includes a gear housing accommodating the gear and at least a portion of the shaft, wherein the first pin, the second pin and the actuator are coupled to the gear housing.

In some embodiments, the wheel drive system includes a wheel hub assembly coupled to the rotatable shaft, and the base member is coupled to or is an integral portion of the wheel hub assembly.

In some embodiments, the wheel drive system includes a motor coupled to the gear.

In some embodiments, the first curved slot and the second curved slot are circular arc slots formed on a flat surface of the base member, the first curved slot and the second curved slot being positioned along a circle having a center point that coincides with the rotation axis of the rotatable shaft.

In some embodiments, the first curved slot and the second curved slot having the same arc slot length and are equally spaced along the circle.

In some embodiments, the first curved slot is positioned along a first circle having a first radius and a first center point that coincides with the rotation axis, wherein the second curved slot is positioned along a second circle having a second radius and a second center point that coincides with the rotation axis, the second radius being greater that the first radius.

In some embodiments, the first curved slot and the second curved slot are formed on a lateral surface of the base member.

In some embodiments, the first curved slot and the second curved slot having the same arc slot length and are equally spaced on the lateral surface of the base member.

In some embodiments, the wheel drive system includes three or more curved slots and three or more pins.

In some embodiments, a maximal backlash of the base member is smaller than an arc slot length of the first curved slot or the second curved slot.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 1C, 1D and 1E are schematic illustrations of the side view of the system for locking rotatable shaft, showing a base member of the system at different angular positions, according to some embodiments of the present invention;

FIGS. 3B, 3C and 3D are schematic illustrations of the side view of the system for locking the rotatable shaft, showing the base member of the system at different angular positions, according to some embodiments of the present invention;

FIGS. 4B, 4C and 4D are schematic illustrations of the side view of the system for locking the rotatable shaft, showing the base member of the system at different angular positions, according to some embodiments of the present invention;

Figure 1A:
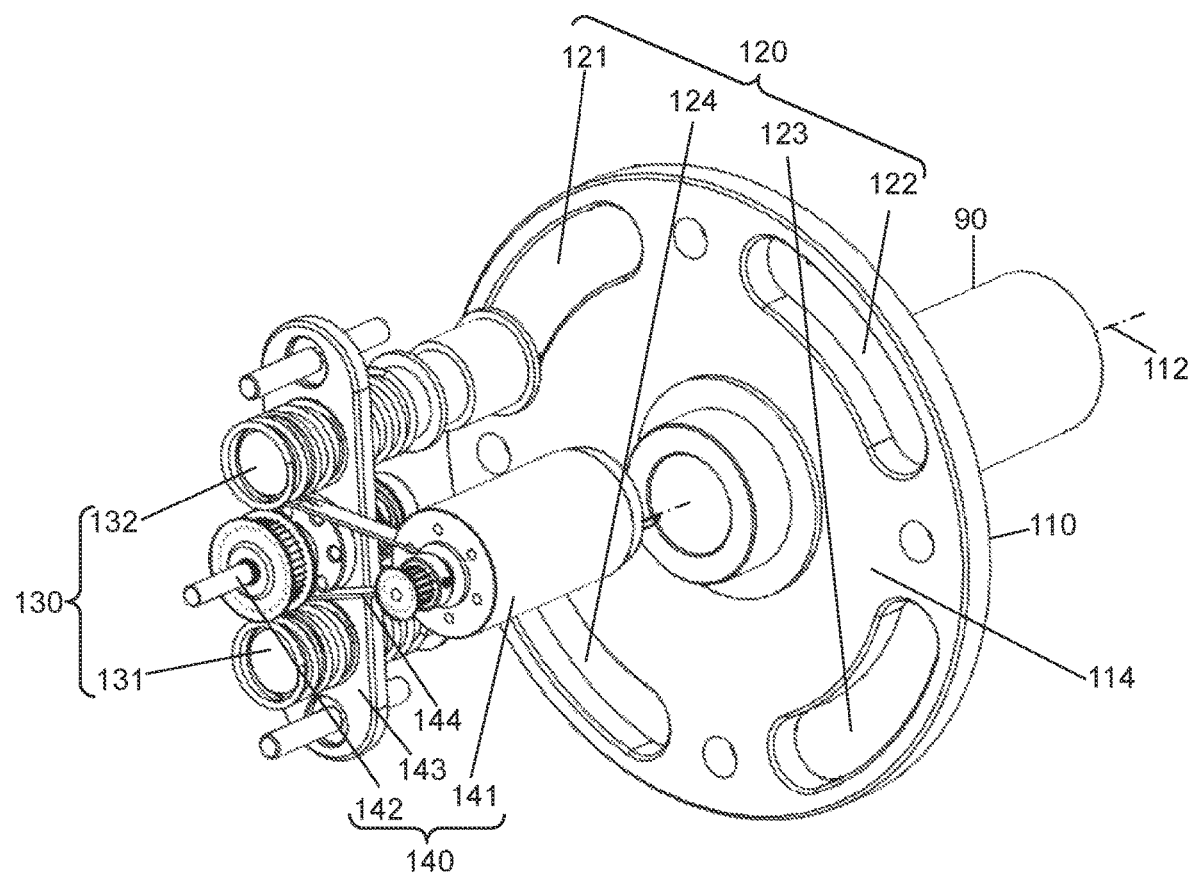
FIG. 1A is a three-dimensional (3D) diagram of a system for locking a rotatable shaft, according to some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Reference is now made to FIG. 1A, which is a three-dimensional (3D) diagram of a system 100 for locking a rotatable shaft 90, according to some embodiments of the present invention.

Figure 1B:
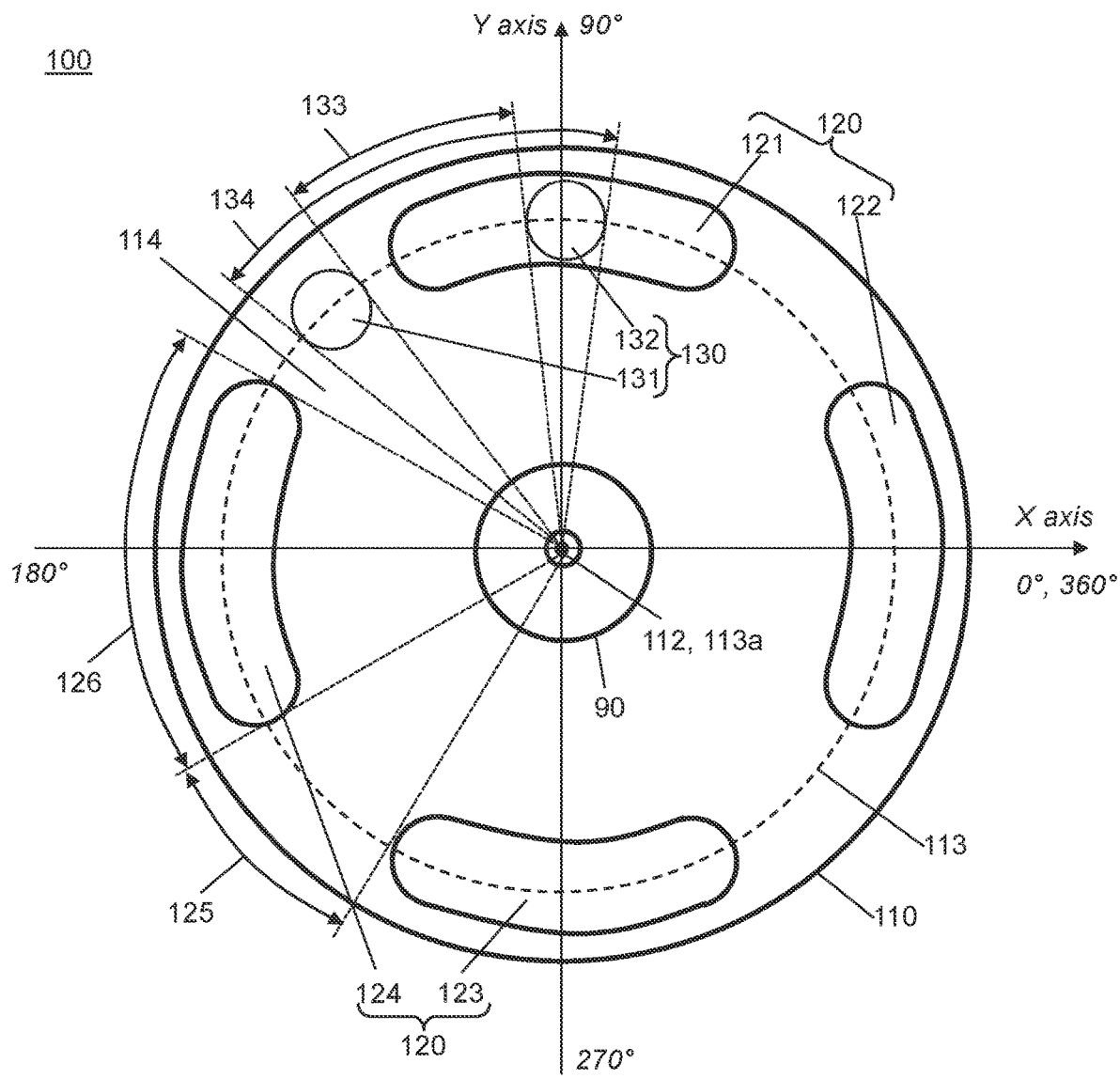
FIG. 1B is a schematic illustration of a side view of the system for the locking rotatable shaft, according to some embodiments of the present invention.

Reference is also made to FIGS. 1B, which is a schematic illustration of a side view of system 100 for locking rotatable shaft 90, according to some embodiments of the present invention.

Reference is also made to FIGS. 1C, 1D and 1E, which are schematic illustrations of the side view of system 100 for locking rotatable shaft 90, showing a base member 110 of system 100 at different angular positions, according to some embodiments of the present invention.

System 100 (e.g., also referred herein as "locking system 100") may include a base member 110. Base member 110 may be a structural element made of, for example, a metal material, a composite material or any other material known in the art. Base member 110 may have a circular (or substantially circular) shape (e.g., as shown in FIGS. 1A-1E) or any other shape (e.g., a polygonal shape). Base member 110 may be coupled to a rotatable shaft 90. Base member 110 may rotate about a rotation axis 112 being also a rotation axis of shaft 90. Base member 110 may rotate about rotation axis 112 through a plurality of angular positions. For example, FIG. 1B shows an arbitrary cartesian XY coordinate system having, e.g., a zero angular position (0°) on the positive X axis, 90° angular position on the positive Y axis, 180° angular position on the negative X axis and 270° angular position on the negative Y axis. Angular positions may be defined in other ways as well.

Base member 110 may include two or more curved or arc slots 120. For example, curved slots 120 may be circular arc slots. Curved slots 120 may be positioned or formed on, or made through, a flat surface 114 of base member 110 (e.g., as shown in FIGS. 1A-1E). For example, base member 110 may include a first curved slot 121, a second curved slot 122, a third curved slot 123 and a fourth curved slot 124 (e.g., as shown in FIGS. 1A-1E). While four curved slots 120 are shown, different numbers of curved slots, e.g., one curved slot, two curved slots, three curved slots or more than four curved slots, may be used in some embodiments of the present invention.

Locking system 100 may include two or more pins or rods 130. For example, system 100 may include a first pin 131 and a second pin 132. Pins 130 may be parallel (or substantially parallel) to rotation axis 112 of base member 110. Pins 130 may be positioned with respect to base member 110 such that at least one of pins 130 is aligned with at least one of curved slots 120 of base member 110 for any angular position of base member 110. For example, FIGS. 1C-1E show base member 110 at different angular positions, wherein for each of the angular positions shown in FIGS. 1C-1E, at least one of pins 130 is aligned with at least one of curved slots 120 of base member 110. While two pins 130 are shown, different numbers of pins, e.g., one pin, three or more pins, may be used in some embodiments of the present invention.

Locking system 100 may include an actuator 140 (e.g., as shown in FIG. 1A). When actuated, actuator 140 may actuate or displace pins 130 to removably insert at least one of pins 130 into at least one of curved slots 120 to limit or stop rotation of base member 110 and of shaft 90 about rotation axis 112. In some embodiments, actuator 140 simultaneously actuates or displaces all pins 130. In some embodiments, actuator 140 includes a motor 141, a lead screw 142 coupled to pins 130 using a coupling plate 143 and a transmission (e.g., transmission belt) 144 to transmit rotations of motor 141 to lead screw 142 (e.g., as shown in FIG. 1A). In some embodiments, each of pins 130 is spring-loaded (e.g., as shown in FIG. 1A). Other configurations of actuator 140 can be used. In some embodiments, system 100 includes two or more actuators (e.g., solenoid-based actuators), one actuator for one of two or more pins 130.

In some embodiments, curved slots 120 are positioned on flat surface 114 of base member 110 along a circle 113 (e.g., a virtual circle schematically indicated in FIG. 1B using a dotted line) having a center point 113a that coincides with rotation axis 112 of base member 110. For example, curved slots 120 may be positioned on flat surface 114 of base member 110 at the same radial distance from rotation axis 112. In some embodiments, curved slots 120 are equally spaced with respect to each other along circle 113. For example, each two adjacent curved slots (e.g., (i) first and second curved slots 121,122; (ii) second and third curved slots 122, 123; (iii) third and fourth curved slots 123, 124; and (iv) fourth and first curved slots 124, 121) may be positioned along circle 113 at a predefined inter-slots arc length or distance 125 with respect to each other. In some embodiments, all curved slots 120 have the same arc slot length along circle 113. For example, each of curved slots 120 may have a predefined arc slot length 126 along circle 113.

In some embodiments, pins 130 are positioned along circle 113. Each two adjacent pins (e.g., first and second pins 131, 132) may be positioned with respect to each other at a first inter-pins arc length or distance 133 along circle 113 (e.g., a distance measured between most proximal points of the adjacent pins along circle 113). In some embodiments, first inter-pins arc length or distance 133 is equal to inter-slots arc length or distance 125. In some embodiments, a second inter-pins arc length or distance 134 between each two adjacent pins (e.g., a distance measured between most distal points of the adjacent pins along circle 113) is equal to arc slot length 126 of curved slots 120.

Relative positions and dimensions of curved slots 120 of base member 110 and of pins 130 according to some embodiments of the present invention (e.g., as described hereinabove) may ensure that for each angular position of base member 110 at least one of pins 130 is aligned with one of curved slots 120 of base member 110. Accordingly, for each angular position of base member 110, at least one of pins 130 may engage, when actuated or displaced by actuator 140, with at least one of curved slots 120 of base member 110 to limit or stop rotation of base member 110 and of shaft 90 about rotation axis 112.

For example, FIG. 1C shows base member 110 at a first angular position 110a at which second pin 132 is aligned with first curved slot 121. After being actuated by actuator 140 (not shown in FIG. 1C), second pin 132 may engage with first curved slot 121 to limit rotation of base member 110 up to arc slot length 126 towards a second angular position 110b shown in FIG. 1D or a third angular position 10c shown in FIG. 1E, depending on direction of rotation of base member 110 and shaft 90. In one example, after base member 110 reaches second angular position 110b (e.g., as shown in FIG. 1D), first pin 131 may engage with first curved slot 121 to stop rotation of base member 110 and shaft 90. In another example, after base member 110 reaches third angular position 110c (e.g., as shown in FIG. 1E), first pin 131 may engage with fourth curved slot 124 to stop rotation of base member 110 and shaft 90. In some embodiments, a maximal backlash of base member 110 is smaller than arc slot length 126 (measured along circle 113 as described hereinabove).

Figure 2A:
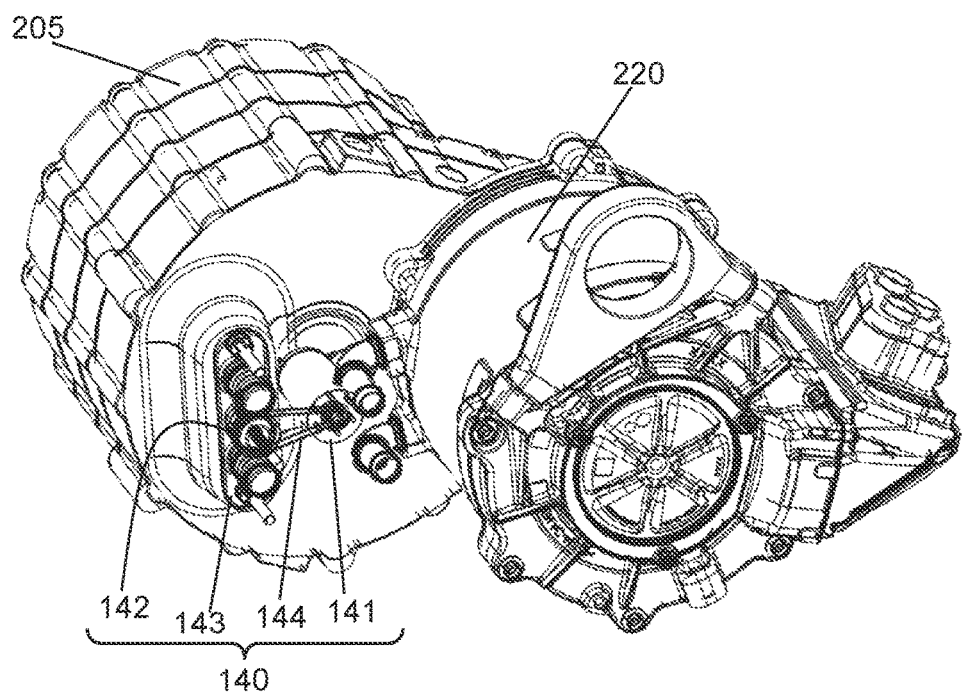
FIGS. 2A and 2B are 3D diagrams of a gear assembly and of the system for locking a rotatable shaft of the gear assembly, according to some embodiments of the present invention.
Figure 2B:
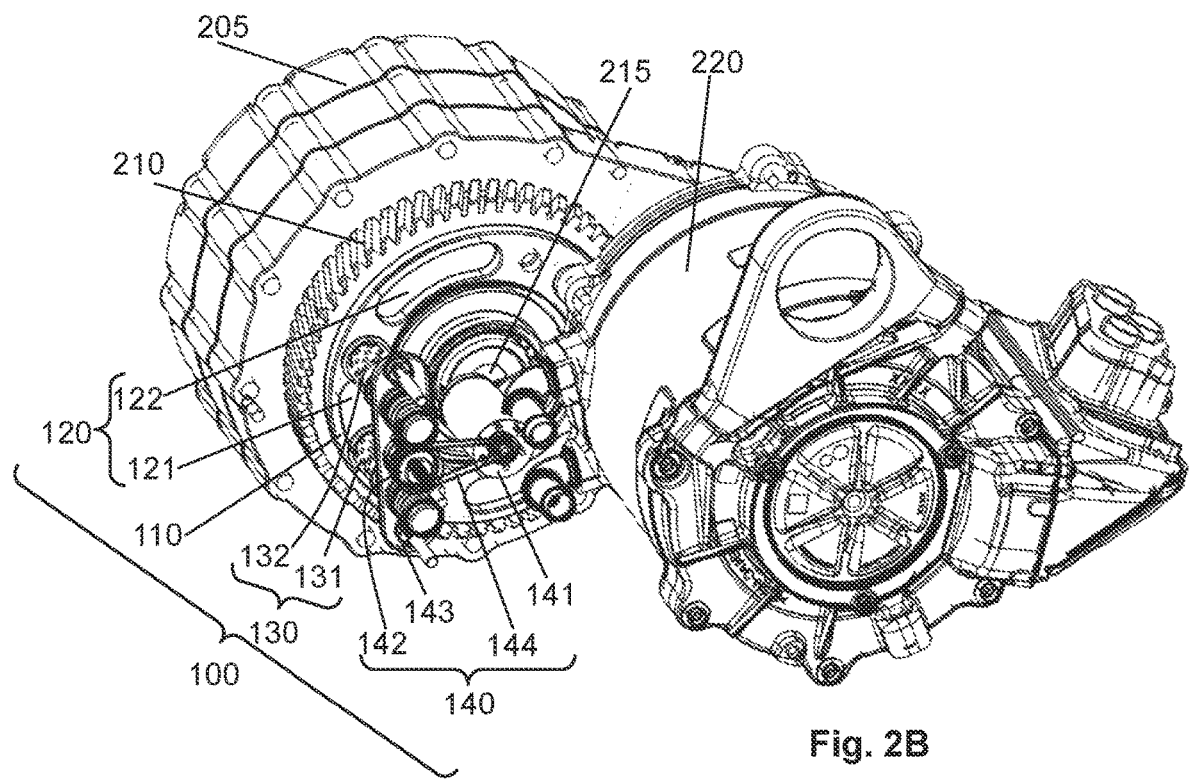

Reference is now made to FIGS. 2A and 2B, which are three-dimensional (3D) diagrams of a gear assembly 200 and of system 100 for locking a rotatable shaft of gear assembly 200, according to some embodiments of the present invention.

According to some embodiment of the present invention, gear assembly 200 includes a housing 205, a gear 210, a shaft 215 coupled to gear 210 and a motor 220. Gear assembly 200 may be part of, for example, a wheel drive assembly. Locking system 100 may be coupled to or may be included in gear assembly 200. For example, base member 110 having curved slots 120 may be coupled to or may be an integral portion of gear 210 (e.g., as shown in FIG. 2B presenting partly exposed housing 205), and pins 130 and actuator 140 may be coupled to housing 205 of gear assembly 200 (e.g., as shown in FIG. 2A). System 100 may releasably lock shaft 215 of gear assembly 200 by engaging at least one of pins 130 with at least one of curved slots 120 of base member 110 of system 100 to limit or stop rotation of base member 110, gear 210 and shaft 215 (e.g., as described above with respect to FIGS. 1A-1E).

While FIGS. 2A-2B show system 100 being coupled to or included in gear assembly 200, locking system 100 may be used with assemblies of a vehicle corner system or a wheel drive system. For example, locking system 100 may be coupled to or included in a wheel hub assembly of the vehicle corner system or the wheel drive system. In this example, system 100 may releasably lock a shaft coupled to or being an integral portion of a wheel hub to provide the wheel hub assembly with the wheel hub shaft locking capabilities. In some embodiments, system 100 is used as parking lock system.

Figure 3A:
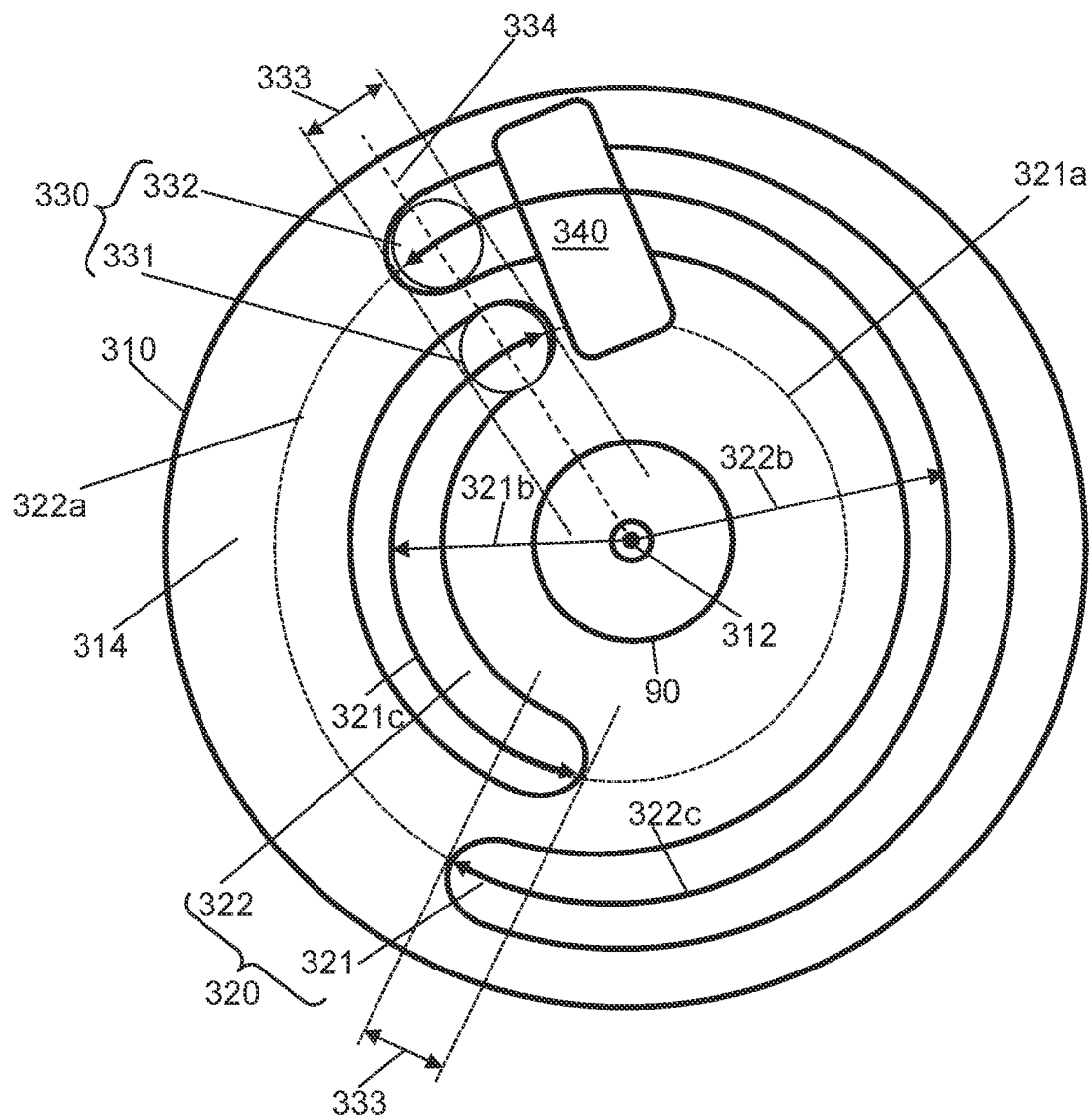
FIG. 3A is a schematic illustration of a side view of a system for locking a rotatable shaft, the system including a base member having curved slots positioned at different radial distances from a rotation axis of the base member and at opposite sides of the base member with respect to the rotation axis, according to some embodiments of the present invention.

Reference is now made to FIG. 3A, which is a schematic illustration of a side view of a system 300 for locking a rotatable shaft 90, system 300 including a base member 310 having curved slots 320 positioned at different radial distances from a rotation axis 312 of base member 310 and at opposite sides of base member 310 with respect to rotation axis 312, according to some embodiments of the present invention.

Reference is also made to FIGS. 3B, 3C and 3D, which are schematic illustrations of the side view of system 300 for locking rotatable shaft 90, showing base member 310 of system 300 at different angular positions, according to some embodiments of the present invention.

System 300 (e.g., also referred herein as "locking system 300") may include a base member 310. Base member 310 may be coupled to a rotatable shaft 90. Base member 310 may rotate about a rotation axis 312 being also a rotation axis of shaft 90. Base member 310 may rotate about rotation axis 312 through a plurality of angular positions (e.g., as described above with respect to FIG. 1B).

Base member 310 may include two or more curved or arc slots 320, for example a first curved slot 321 and a second curved slot 322. For example, curved slots 320 may be circular arc slots. Curved slots 320 may be positioned or formed on, or made through, a flat surface 314 of base member 310 (e.g., as shown in FIGS. 3A-3D). Curved slots 320 may be positioned at different radial distances from rotation axis 312 with respect to each other. For example, as shown in FIGS. 3A-3D, first curved slot 321 may be positioned along a first circle 321a (e.g., a virtual circle) having a first radius 321b and a center point that coincides with rotation axis 312. In the same example, second curved slot 322 may be positioned along a second circle 322a (e.g., a virtual circle) having a second radius 322b and a center point that coincides with rotation axis 312. In the same example, second radius 322b of second circle 322a is greater than first radius 321b of first circle 321a.

Locking system 300 may include two or more pins or rods 330 (e.g., one pin for one of curved slots 320). For example, system 300 may include a first pin 331 and a second pin 332. Pins 330 may be parallel (or substantially parallel) to rotation axis 312 of base member 310. Pins 330 may be positioned at different radial distances from rotation axis 312 of base member 310. First pin 331 may be positioned at first radius 321b from rotation axis 312 of base member 310 (e.g., along first circle 321a) and second pin 332 may be positioned at second radius of 322b from rotation axis 312 of base member 310 (e.g., along second circle 322a).

While two curved slots 320 and two pins 330 are shown, different numbers of curved slots and pins may be used in some embodiments of the present invention, e.g., one curved slot and one pin, or two or more curved slots and two or more pins may be used.

Relative positions and dimensions of curved slots 320 of base member 310 and of pins 330 may ensure that for each angular position of base member 310 at least one of pins 330 is aligned with one of curved slots 320 of base member 310. For example, first curved slot 321 and second curved slot 322 may be on opposite sides of base member 310 with respect to rotation axis 312 of base member 310, e.g., as shown in FIGS. 3A-3D. In the same example, first pin 331 and second pin 332 may be at the same side of base member 310 with respect to rotations axis 312 of base member 310 (e.g., as shown in FIGS. 3A-3D). An arc slot length 322c of second curved slot 322 along second circle 322a may be greater than an arc slot length 321c of first curved slot 321 along first circle 321a, e.g., such that an overlap 333 of at least two diameters of pins 330 is formed between first curved slot 331 and second curved slot 332 (e.g., as shown in FIGS. 3A-3D). First pin 331 and second pin 332 may be positioned, for example, along the same line 334 extending outwardly from rotation axis 312 of base member 312 (e.g., such that an angle between first pin 331 and second pin 332 with respect to rotation axis 312 is zero; as shown in FIGS. 3A-3D). The angle between first pin 331 and second pin 332 may depend on overlap 333 between first curved slot 331 and second curved slot 332. For example, the larger the overlap between first curved slot 331 and second curved slot 332, the greater the angle between first pin 331 and second pin 332 can be.

Different arc slot lengths of curved slots 320 and different positions of pins 330 than shown in and described with respect to FIGS. 3A-3D may be used to ensure that at least one of pins 330 is aligned with one of curved slots 320 of base member 310 for any angular position of base member 310.

FIGS. 3B, 3C and 3D show examples of base member 310 at different angular positions 310a, 310b and 310c, respectively. At each of angular positions 310a, 310b and 310c, at least one of pins 330 is aligned with at least one of curved slots 320.

Locking system 300 may include an actuator 340 (e.g., as shown in FIG. 3A). When actuated, actuator 340 may actuate or displace pins 330 to removably insert at least one of pins 330 into at least one of curved slots 320 to limit or stop rotation of base member 310 and of shaft 90 about rotation axis 312 (e.g., as described above with respect to FIGS. 1A-IE). Actuator 340 may be similar to, for example, actuator 140 described above with respect to FIG. 1A, or may include any other actuator known in the art.

System 300 may be used as a shaft locking system in, for example, a vehicle corner system or a wheel drive system. For example, system 300 may be used in a gear assembly or in a wheel hub assembly of the vehicle corner system or wheel drive system (e.g., as described above with respect to FIGS. 2A and 2B and as described below with respect to FIGS. 6A-6C). In some embodiments, system 300 is used as parking lock system.

Figure 4A:
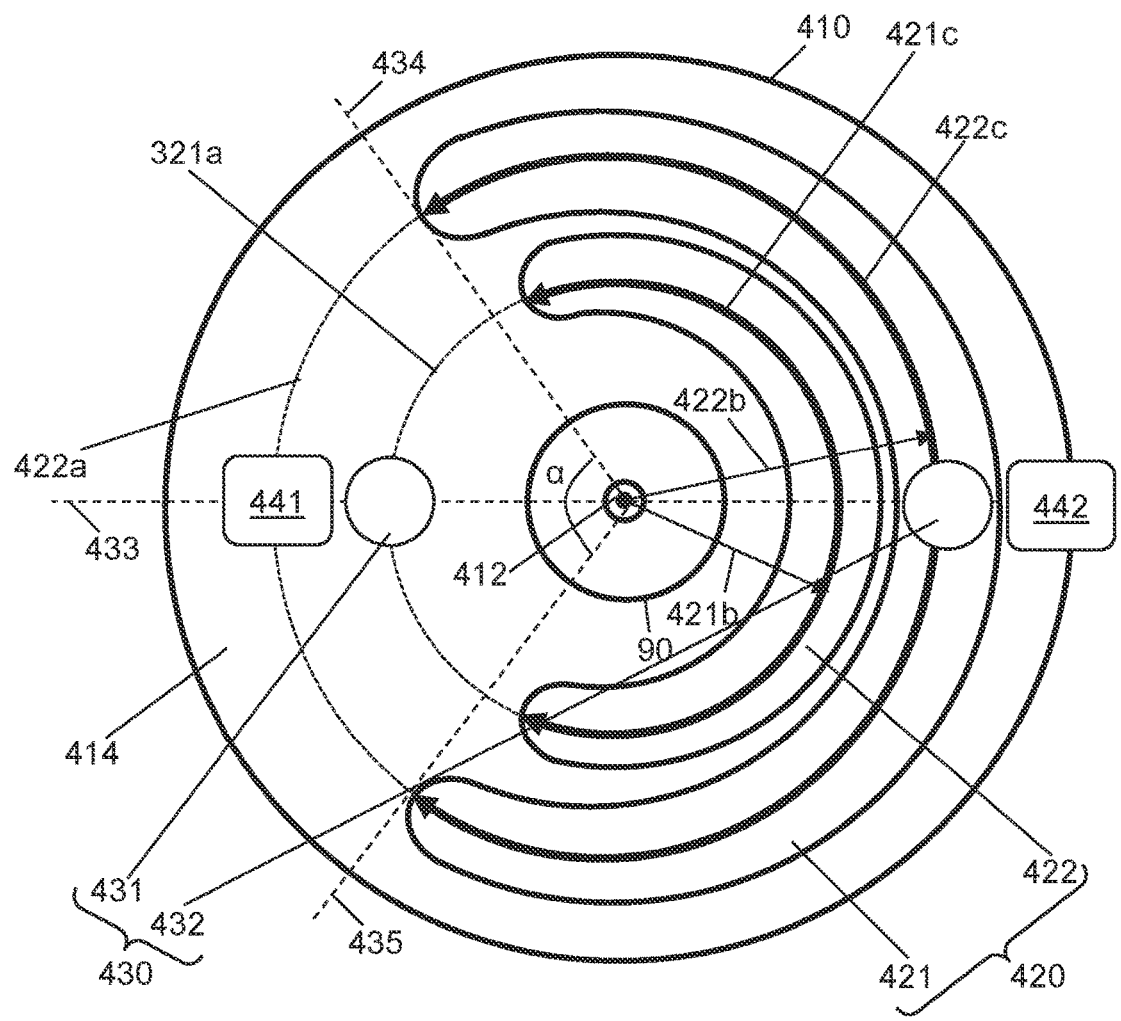
FIG. 4A is a schematic illustration of a side view of a system for locking a rotatable shaft, the system including a base member having curved slots positioned at different radial distances from a rotation axis of the base member and at the same side of the base member with respect to the rotation axis, according to some embodiments of the present invention.

Reference is now made to FIG. 4A, which is a schematic illustration of a side view of a system 400 for locking a rotatable shaft 90, system 400 including a base member 410 having curved slots 420 positioned at different radial distances from a rotation axis 412 of base member 410 and at the same side of base member 410 with respect to rotation axis 412, according to some embodiments of the present invention.

Reference is also made to FIGS. 4B, 4C and 4D, which are schematic illustrations of the side view of system 400 for locking rotatable shaft 90, showing base member 410 of system 400 at different angular positions, according to some embodiments of the present invention.

System 400 (e.g., also referred herein as "locking system 400") may include a base member 410. Base member 410 may be coupled to a rotatable shaft 90. Base member 410 may rotate about a rotation axis 412 being also a rotation axis of shaft 90. Base member 410 may rotate about rotation axis 412 through a plurality of angular positions (e.g., as described above with respect to FIG. 1B).

Base member 410 may include two or more curved or arc slots 420, for example a first curved slot 421 and a second curved slot 422. For example, curved slots 420 may be circular arc slots. Curved slots 420 may be positioned or formed on, or made through, a flat surface 414 of base member 410 (e.g., as shown in FIGS. 4A-4D). Curved slots 420 may be positioned at different radial distances from rotation axis 412 with respect to each other. For example, as shown in FIGS. 4A-4D, first curved slot 421 may be positioned along a first circle 421a (e.g., a virtual circle) having a first radius 421b and a center point that coincides with rotation axis 412. In the same example, second curved slot 422 may be positioned along a second circle 422a (e.g., a virtual circle) having a second radius 422b and a center point that coincides with rotation axis 412. In the same example, second radius 422b of second circle 422a is greater than first radius 421b of first circle 421a.

Locking system 400 may include two or more pins or rods 430 (e.g., one pin for one of curved slots 420). For example, system 400 may include a first pin 431 and a second pin 432. Pins 430 may be parallel (or substantially parallel) to rotation axis 412 of base member 410. Pins 430 may be positioned at different radial distances from rotation axis 412 of base member 410. First pin 431 may be positioned at first radius 421b from rotation axis 412 of base member 410 (e.g., along first circle 421a) and second pin 432 may be positioned at second radius of 422b from rotation axis 412 of base member 410 (e.g., along second circle 422a).

While two curved slots 420 and two pins 430 are shown, different numbers of curved slots and pins may be used in some embodiments of the present invention, e.g., one curved slot and one pin, or two or more curved slots and two or more pins may be used.

Relative positions and dimensions of curved slots 420 of base member 410 and of pins 430 may ensure that for each angular position of base member 410 at least one of pins 430 is aligned with one of curved slots 420 of base member 410. For example, first curved slot 421 and second curved slot 422 may be on the same side of base member 410 with respect to rotation axis 412 of base member 410, e.g., as shown in FIGS. 4A-4D. In the same example, first pin 431 and second pin 432 may be at opposite sides of base member 410 with respect to rotations axis 412 of base member 410 (e.g., as shown in FIGS. 4A-4D). An arc slot length 422c of second curved slot 422 along second circle 422a may be greater than an arc slot length 421c of first curved slot 421 along first circle 421a, e.g., at least by two diameters of pins 430 (e.g., as shown in FIGS. 4A-4D). First pin 431 and second pin 432 may be positioned along the same line 433 extending through rotation axis 412 of base member 412 (e.g., such that a central angle between first pin 431 and second pin 432 with respect to rotation axis 412 is 180°; as shown in FIGS. 4A-4D). In some embodiments, the central angle between first pin 431 and second pin 432 may be within a range of 180°±0.5·α, wherein a is a central angle between lines 434, 435 extending from rotation axis 412 of base member 410 and tangent to opposite ends of second curved slot 422 (e.g., as shown in FIG. 4A). Different arc slot lengths of first curved slot 421 and second curved slot 422 and different positions of first pin 431 and second pin 432 than shown in and described with respect to FIGS. 4A-4D may be used to ensure that at least one of pins 430 is aligned with one of curved slots 420 of base member 410 for any angular position of base member 410.

FIGS. 4B, 4C and 4D show examples of base member 410 at different angular positions 410a, 410b and 410c, respectively. At each of angular positions 410a, 410b and 410c, at least one of pins 430 is aligned with at least one of curved slots 420.

Locking system 400 may include one or more actuators— e.g., a first actuator 441 to actuate or displace first pin 431 and a second actuator 442 to actuate or displace second pin 432. When actuated, the actuator(s) may actuate or displace pins 430 to removably insert at least one of pins 430 into at least one of curved slots 420 to limit or stop rotation of base member 410 and of shaft 90 about rotation axis 412 (e.g., as described above with respect to FIGS. 1A-1E).

System 400 may be used as a shaft locking system in, for example, a vehicle corner system or a wheel drive system. For example, system 400 may be used in a gear assembly or in a wheel hub assembly of the vehicle corner system or wheel drive system (e.g., as described above with respect to FIGS. 2A and 2B and as described below with respect to FIGS. 6A-6C). In some embodiments, system 400 is used as parking lock system.

Figure 5A:
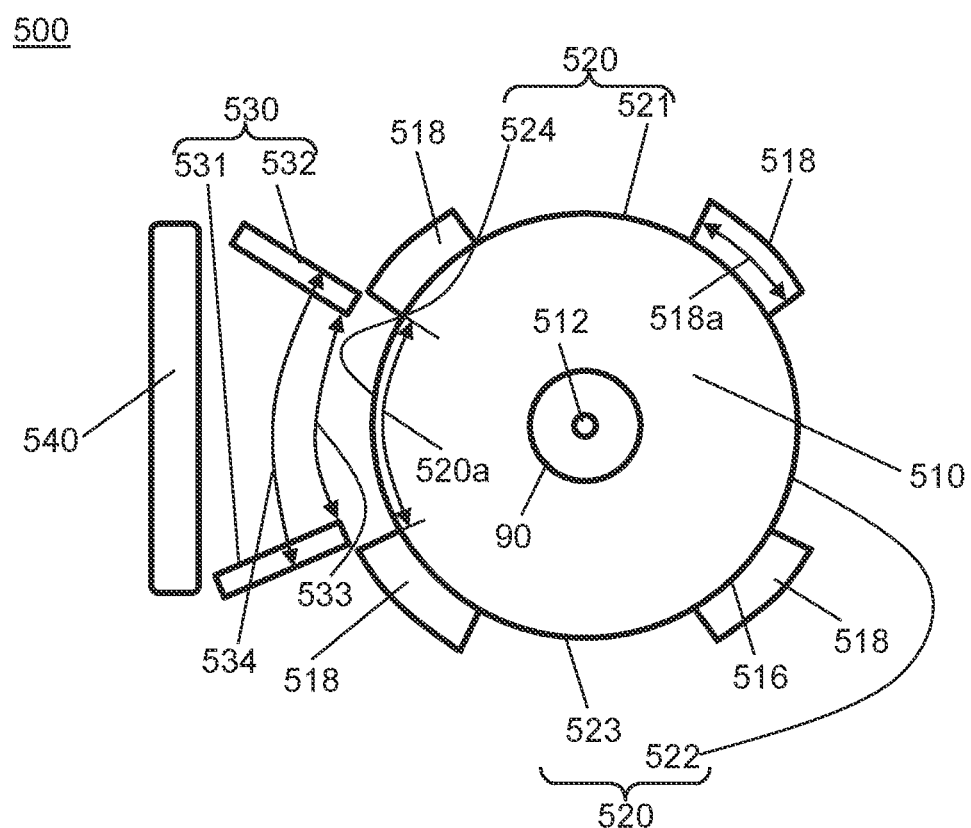
FIG. 5A is a schematic illustration of a side view of a system for locking a rotatable shaft, the system including a base member having curved slots positioned on lateral surface of the base member, according to some embodiments of the present invention.

Reference is now made to FIG. 5A, which is a schematic illustration of a side view of a system 500 for locking a rotatable shaft 90, system 500 including a base member 510 having curved slots 520 on lateral surface 516 of base member 510, according to some embodiments of the present invention.

Figure 5D:
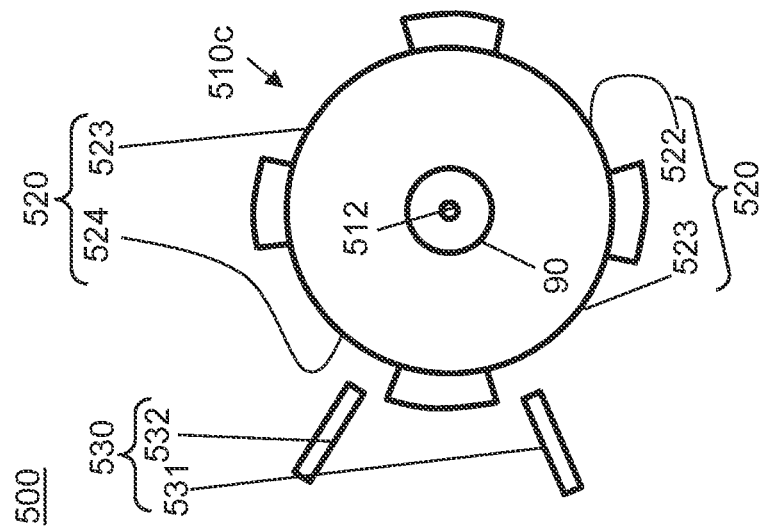
FIGS. 5B, 5C and 5D are schematic illustrations of the side view of the system for locking the rotatable shaft, showing the base member of the system at different angular positions, according to some embodiments of the present invention.
Figure 5C:
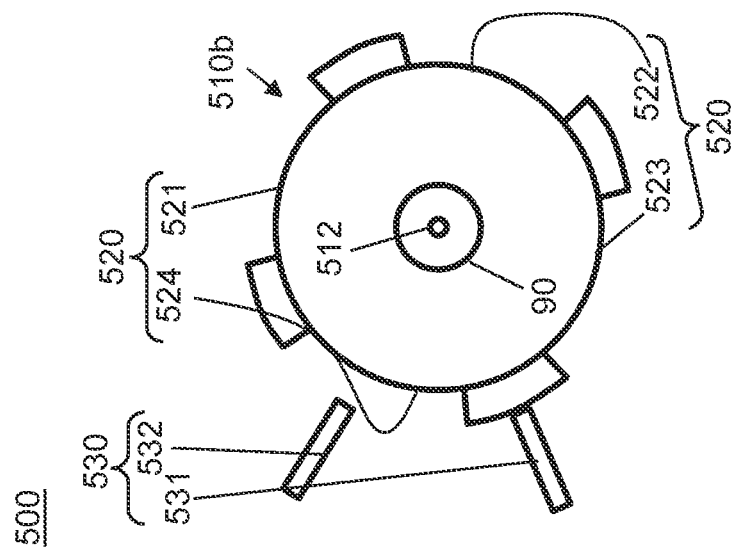
Figure 5B:
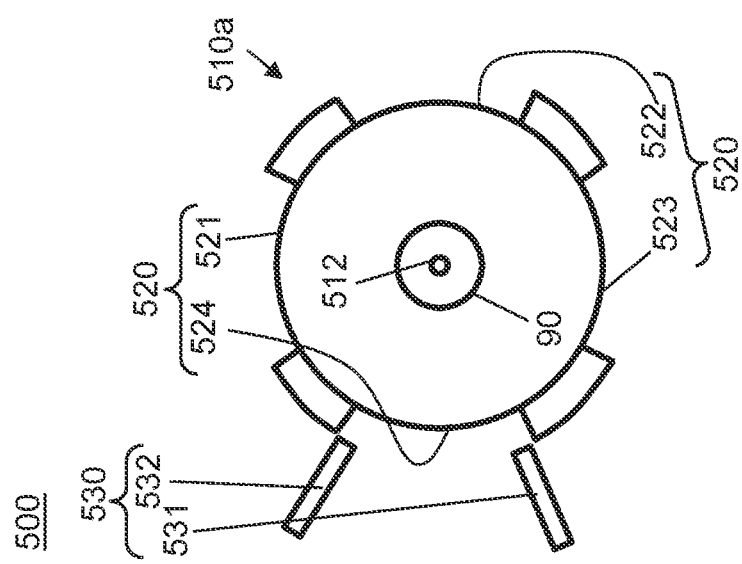

Reference is also made to FIGS. 5B, 5C and 5D, which are schematic illustrations of the side view of system 500 for locking rotatable shaft 90, showing base member 510 of system 500 at different angular positions, according to some embodiments of the present invention.

System 500 (e.g., also referred herein as "locking system 500") may include a base member 510. Base member 510 may be coupled to a rotatable shaft 90. Base member 510 may rotate about a rotation axis 512 being also a rotation axis of shaft 90. Base member 510 may rotate about rotation axis 512 through a plurality of angular positions (e.g., as described above with respect to FIG. 1B).

Base member 510 may include two or more curved or arc slots 520. Curved slots 520 may be positioned or formed on a lateral surface 516 of base member 510 (e.g., as shown in FIGS. 5A-5D). For example, base member 510 may include a first curved slot 521, a second curved slot 522, a third curved slot 523 and a fourth curved slot 524. For example, curved slots 520 may be circular arc slots. In some embodiments, curved slots 520 are equally spaced with respect to each other on lateral surface 516 of base member 510 (e.g., as shown in FIG. 5A). Curved slots 520 may be formed as, for example, indents or cuts on lateral surface 516 of baser member 510. Base member 510 may, for example, include radial portions 518 protruding radially from lateral surface 516 of base member 510 and forming curved slots 520 between protrusions 518. In some embodiments, curved slots 520 have the same arc slot length and are equally spaced on lateral surface 516 of base member 510. While four curved slots 520 are shown, different numbers of curved slots, e.g., one curved slot, two curved slots, three curved slots or more than four curved slots, may be used in some embodiments of the present invention.

Locking system 500 may include two or more pins or rods 530. For example, system 500 may include a first pin 531 and a second pin 532. Pins 530 may be perpendicular (or substantially perpendicular) to rotation axis 512 of base member 510. Pins 530 may be positioned with respect to base member 510 such that at least one of pins 530 is aligned with at least one of curved slots 520 of base member 510 for any angular position of base member 510. For example, FIGS. 5B, 5C and 5D show base member 510 at different angular positions 510a, 510b and 510c, respectively. At each of angular positions 510a, 510b and 510c, at least one of pins 530 is aligned with at least one of curved slots 520. While two pins 530 are shown, different numbers of pins, for example one pin or three or more pins, may be used in some embodiments of the present invention.

Relative positions and dimensions of curved slots 520 of base member 510 and of pins 530 may ensure that for each angular position of base member 510 at least one of pins 530 is aligned with one of curved slots 520 of base member 510. For example, a first inter-pins arc length or distance 533 (e.g., a distance between proximal surfaces of first pin 531 and second pin 532) may be greater than an arc length 518a of radial protrusions 518 (e.g., as shown in FIG. 5A). In the same example, a second inter-pins arc length or distance 534 (e.g., a distance between distal surfaces of first pin 531 and second pin 532) may be smaller than an arc slot length 520a of curved slots 520 (e.g., as shown in FIG. 5A). Different arc slot lengths of curved slots 520 and different positions of pins 530 than shown in and described with respect to FIGS. 5A-5D may be used to ensure that at least one of pins 530 is aligned with one of curved slots 520 of base member 510 for any angular position of base member 510.

Locking system 500 may include an actuator 540. When actuated, actuator 540 may actuate or displace pins 530 to removably insert at least one of pins 530 into at least one of curved slots 520 to limit or stop rotation of base member 510 and of shaft 90 about rotation axis 512 (e.g., as described above with respect to FIGS. 1A-1E). Actuator 540 may be similar to, for example, actuator 140 described above with respect to FIG. 1A, or may include any other actuator known in the art.

System 500 may be used as a shaft locking system in, for example, a vehicle corner system or a wheel drive system. For example, system 500 may be used in a gear assembly or in a wheel hub assembly of the vehicle corner system or wheel drive system (e.g., as described above with respect to FIGS. 2A and 2B and as described below with respect to FIGS. 6A-6C). In some embodiments, system 500 is used as parking lock system.

Figure 6A:
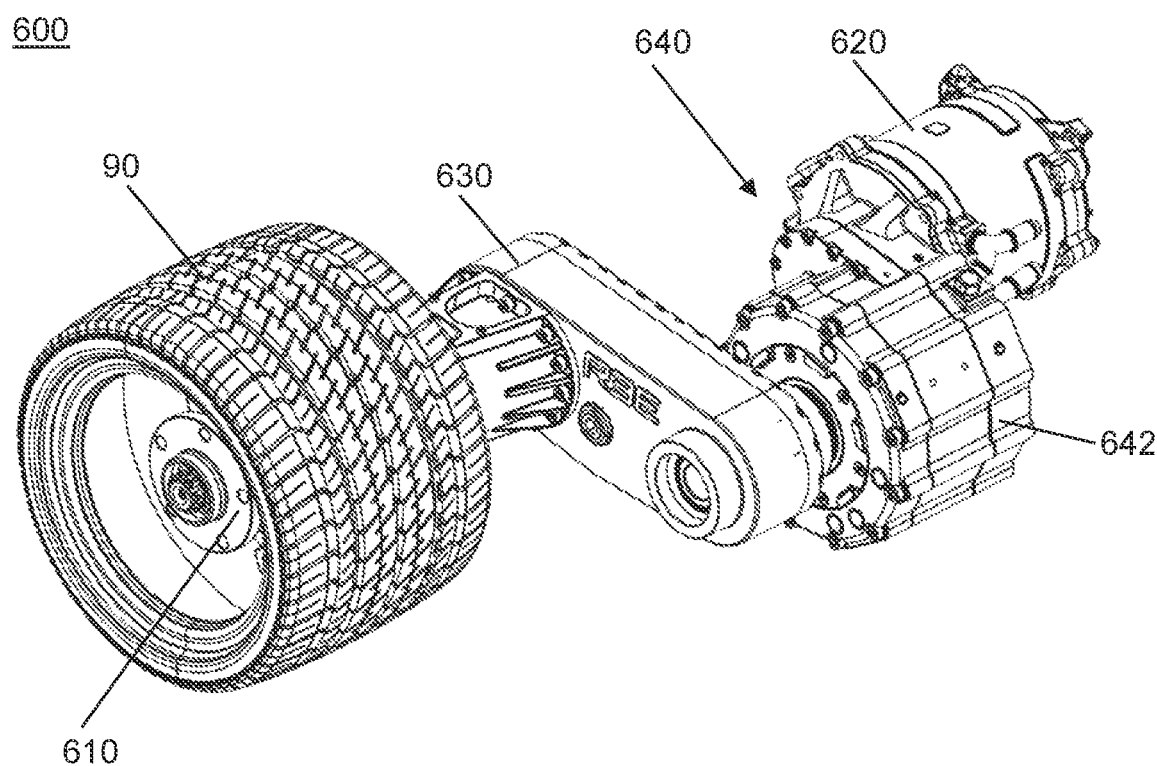
FIGS. 6A, 6B and 6C are 3D diagrams of a wheel drive system, according to some embodiments of the present invention.
Figure 6B:
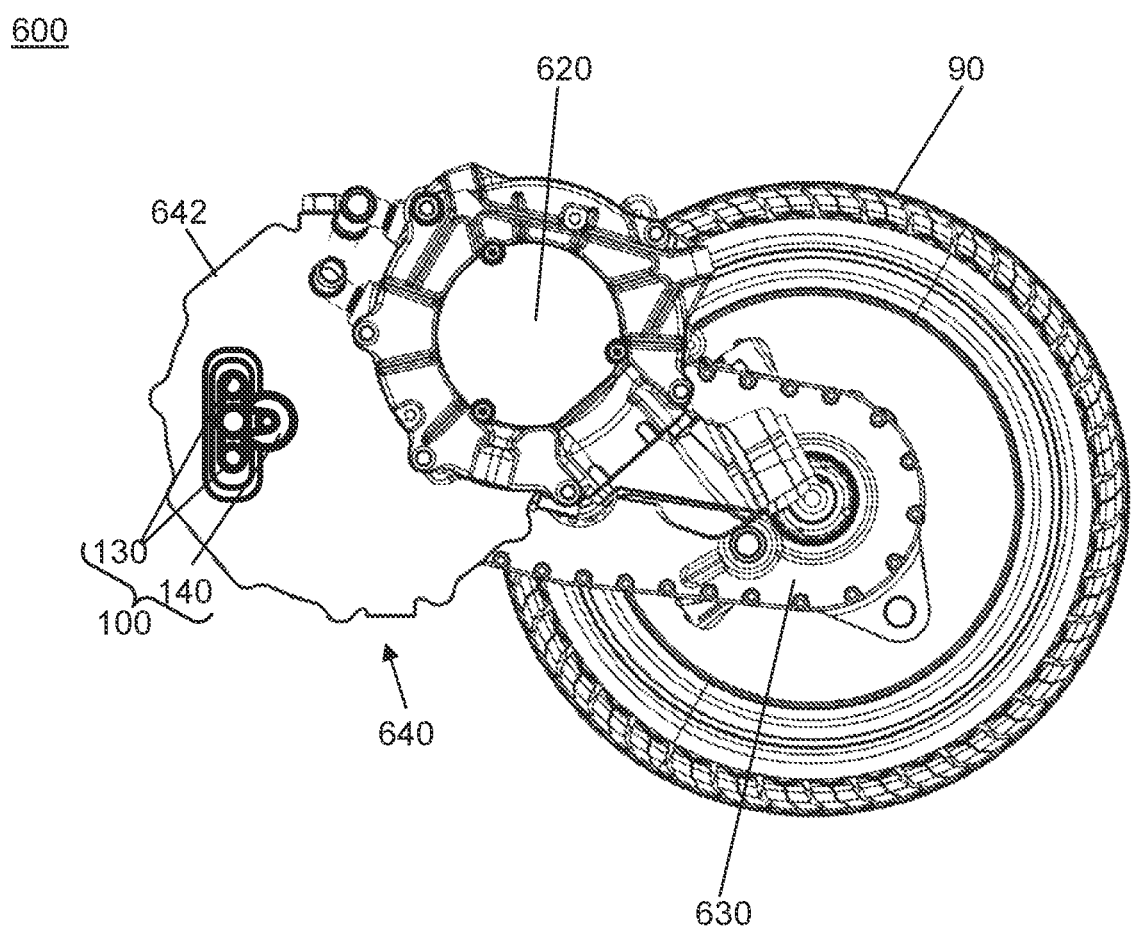
Figure 6C:
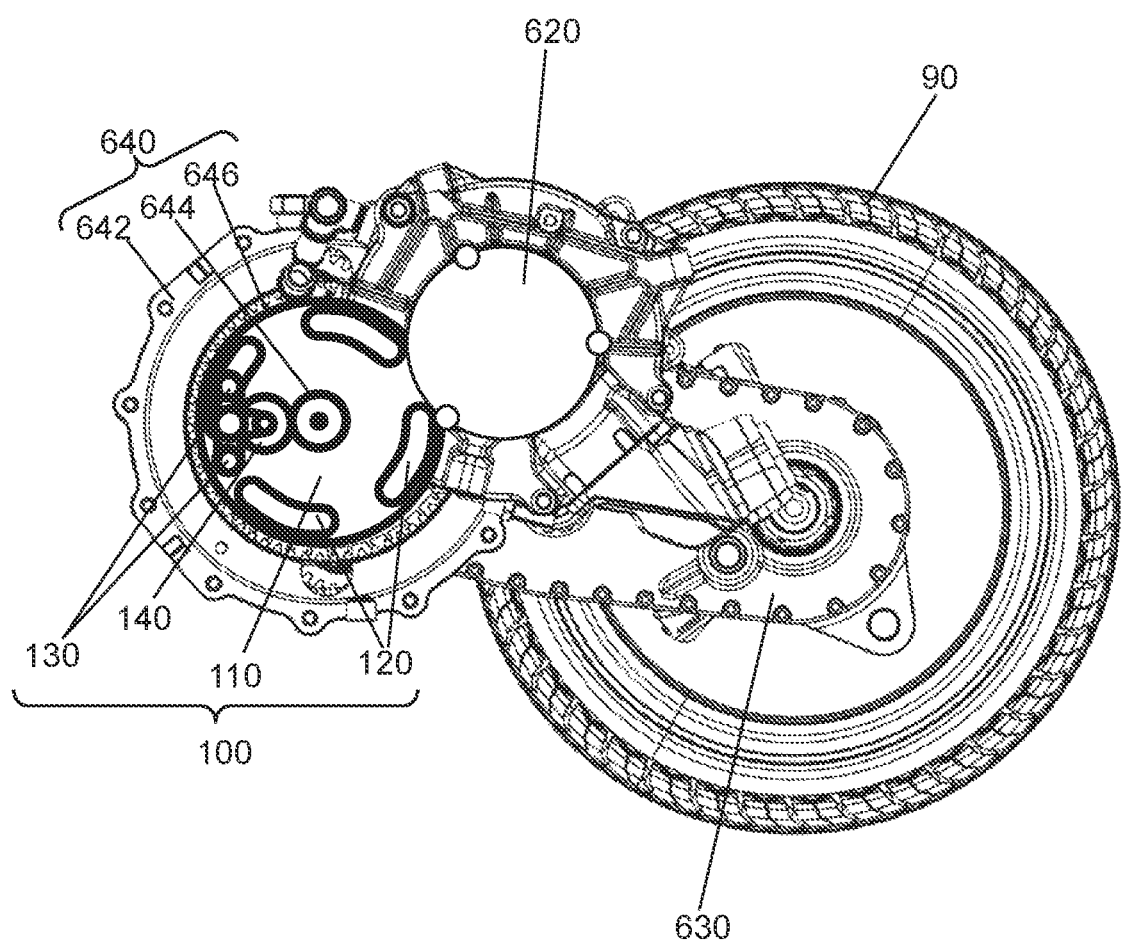

Reference is now made to FIGS. 6A, 6B and 6C, which are 3D diagrams of a wheel drive system 600, according to some embodiments of the present invention. FIG. 6A shows a perspective view of wheel drive system 600. FIGS. 6B and 6C show a side view of wheel drive system 600. FIG. 6C shows partly exposed view of a gear housing 642.

According to some embodiments of the present invention, wheel drive system 600 includes a wheel hub assembly 610, a motor 620, a transmission assembly 630 and a gear assembly 640 including a gear housing 642 accommodating a shaft 644 coupled to a gear 646. Transmission assembly 630 may be optional, for example, when the wheel hub is located at the axis of the gear shaft, or for example when there is no need for the gear reduction in addition to gear assembly 640. Transmission assembly 630 may have a different structure than shown, e.g. structured along the gear rotation axis (instead of or in combination with "sideway" direction as shown in the example in FIG. 6A. Each of transmission assembly 630 and gear assembly 640 may, for example, include two or more gears and/or two or more shafts. A wheel 90 may be coupled to wheel hub assembly 610. Wheel drive system 600 may include a system for locking rotatable shaft, such as locking system 100 shown in FIGS. 6B and 6C. While locking system 100 is shown, any of locking systems described herein (e.g., such as system 300, 400 or 500) may be used in wheel drive system 600. Locking system 100 may be, for example, coupled to or may be included in gear assembly 640. For example, base member 110 having curved slots 120 may be coupled to or may be an integral portion of gear 646 (e.g., as shown in FIG. 6C presenting partly exposed gear housing 642), and pins 130 and actuator 140 may be coupled to gear housing 642 of gear assembly 640 (e.g., as shown in FIG. 6B). System 100 may releasably lock shaft 644 of gear assembly 640 by engaging at least one of pins 130 with at least one of curved slots 120 of base member 110 of system 100 to limit or stop rotation of base member 110, gear 646 and shaft 644 being coupled to gear 646 (e.g., as described above with respect to FIGS. 1A-I E). While FIGS. 6B and 6C show system 100 being coupled to or included in gear assembly 640, system 100 may be used in other portions of wheel drive system 600 such as wheel hub assembly 610 or transmission assembly 630.

The disclosed systems provide simple solutions for locking a rotatable shaft. Each of the disclosed systems includes a base member coupled to a rotatable shaft and having two or more curved slots; two or more pins; and an actuator that when actuated displaces the pins to engage with the curved slots of the base member to limit or stop rotation of the base member and the shaft. Advantageously, the disclosed systems include fewer moving components and are simpler and cheaper than prior art clutch-based systems for locking a rotatable shaft. Furthermore, the relative position and dimensions of the curved slots and the pins of the disclosed systems ensure that at least one of the pins is aligned and can engage with at least one of the curved slots of the base member for any angular position of the base member. Accordingly, the disclosed systems can be actuated even if the shaft is rotating, thus overcoming disadvantages of some prior art systems for locking a rotatable shaft (e.g., tooth-based systems) that require completely stopping rotation of the shaft before actuating the locking system.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for locking a rotatable shaft, the system comprising:
   a base member couplable to the rotatable shaft and rotatable about a rotation axis of the rotatable shaft through a plurality of angular positions, the base member comprises a first curved slot and a second curved slot formed on a flat surface of the base member;
   a first pin and a second pin being positioned with respect to the base member such that at least one of the first pin or the second pin is aligned with at least one of the first curved slot or the second curved slot of the base member for any angular position of the base member; and an actuator to displace at least one of the first pin or the second pin to removably insert at least one of the first pin or the second pin into at least one of the first curved slot or the second curved slot during operation of the system.

2. The system of claim 1, being coupled to or included in a gear assembly having a gear coupled to the rotatable shaft, wherein the base member is coupled to or is an integral portion of the gear.

3. The system of claim 1, being coupled to or included in a wheel hub assembly having a hub coupled to the rotatable shaft, wherein the base member is coupled to or is an integral portion of the hub.

4. The system of claim 1, wherein the first curved slot and the second curved slot are circular arc slots.

5. The system of claim 1, wherein the first pin and the second pin are substantially parallel to the rotation axis of the rotatable shaft.

6. The system of claim 1, wherein the first curved slot and the second curved slot are positioned along a circle having a center point that coincides with the rotation axis of the rotatable shaft.

7. The system of claim 6, wherein the first curved slot and the second curved slot having the same arc slot length and are equally spaced along the circle.

8. The system of claim 6, wherein the first pin and the second pin are positioned along the circle.

9. The system of claim 8, wherein an arc length or distance measured along the circle between most proximal points on the first pin and the second pin is equal to an arc length or distance measured along the circle between the first curved slot and the second curved slot.

10. The system of claim 8, wherein an arc length or distance measured along the circle between most distal points on the first pin and the second pin is equal to the arc slot length of the first curved slot and the second curved slot.

11. The system of claim 1, wherein the first curved slot is positioned along a first circle having a first radius and a first center point that coincides with the rotation axis, wherein the second curved slot is positioned along a second circle having a second radius and a second center point that coincides with the rotation axis, and wherein the second radius is greater that the first radius.

12. The system of claim 11, wherein the first curved slot having a first arc slot length measured along the first circle and the second curved slot having a second arc slot length measured along the second, and wherein second arc slot length is greater than the first arc slot length.

13. The system of claim 11, wherein the first pin is positioned along the first circle and the second pin is positioned along the second circle.

14. The system of claim 11, wherein the first curved slot and the second curved slot are on opposite sides of the base member with respect to the rotation axis of the base member.

15. The system of claim 14, wherein the first pin and the second pin are on the same side of the base member with respect to the rotation axis of the base member.

16. The system of claim 11, wherein the first curved slot and the second curved slot are on the same side of the base member with respect to the rotation axis of the base member.

17. The system of claim 16, wherein the first pin and the second pin are on opposite sides of the base member with respect to the rotation axis of the base member.

18. The system of claim 1, wherein each of the first pin and the second pin is spring-loaded.

19. The system of claim 1, comprising three or more curved slots.

20. The system of claim 1, comprising three or more pins.

21. The system of claim 1, wherein a maximal backlash of the base member is smaller than an arc slot length of the first curved slot or the second curved slot.

22. A wheel drive system comprising:
a shaft rotatable about a rotation axis through a plurality of angular positions;
a gear coupled to the shaft;
a base member coupled to or being an integral portion of the gear, the base member comprising a first curved slot and a second curved slot;
a first pin and a second pin being positioned with respect to the base member such that at least one of the first pin or the second pin is aligned with at least one of the first curved slot or the second curved slot of the base member for any angular position of the base member; and
an actuator to displace at least one of the first pin or the second pin to removably insert at least one of the first pin or the second pin into at least one of the first curved slot or the second curved slot during operation of the wheel drive system;
wherein the first curved slot and the second curved slot are circular arc slots formed on a flat surface of the base member, the first curved slot and the second curved slot being positioned along a circle having a center point that coincides with the rotation axis of the rotatable shaft.

23. The wheel drive system of claim 22, comprising a gear housing accommodating the gear and at least a portion of the shaft, wherein the first pin, the second pin and the actuator are coupled to the gear housing.

24. The wheel drive system of claim 22, comprising a wheel hub assembly coupled to the rotatable shaft, and the base member is coupled to or is an integral portion of the wheel hub assembly.

25. The wheel drive system of claim 22, comprising a motor coupled to the gear.

26. The wheel drive system of claim 22, wherein the first curved slot and the second curved slot having the same arc slot length and are equally spaced along the circle.

27. The wheel drive system of claim 26, wherein the first curved slot is positioned along a first circle having a first radius and a first center point that coincides with the rotation axis, wherein the second curved slot is positioned along a second circle having a second radius and a second center point that coincides with the rotation axis, the second radius being greater that the first radius.

28. The wheel drive system of claim 22, comprising three or more curved slots and three or more pins.

29. The wheel drive system of claim 22, wherein a maximal backlash of the base member is smaller than an arc slot length of the first curved slot or the second curved slot.

* * * * *